United States Patent
Surazhsky et al.

(10) Patent No.: US 10,692,000 B2
(45) Date of Patent: Jun. 23, 2020

(54) TRAINING MACHINE LEARNING MODELS

(71) Applicant: SAP SE, Walldorf (DE)

(72) Inventors: Tatiana Surazhsky, Yokneam Illit (IL); Leonid Bobovich, Ra'anana (IL); Michael Kemelmakher, Hod Hasharon (IL); Ran Moshe Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 32 days.

(21) Appl. No.: 15/463,662

(22) Filed: Mar. 20, 2017

(65) Prior Publication Data

US 2018/0268255 A1   Sep. 20, 2018

(51) Int. Cl.
| | | |
|---|---|---|
| G06K 9/00 | (2006.01) | |
| G06N 3/08 | (2006.01) | |
| G06K 9/62 | (2006.01) | |
| G06N 3/04 | (2006.01) | |

(52) U.S. Cl.
CPC ............ *G06N 3/08* (2013.01); *G06K 9/6255* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 8,051,019 B2 | 11/2011 | Sigal et al. | |
| 9,449,344 B2 | 9/2016 | Deshpande et al. | |
| 10,235,601 B1 * | 3/2019 | Wrenninge | G06K 9/6256 |
| 2015/0294189 A1 * | 10/2015 | Benhimane | G06K 9/6255 |
| | | | 382/195 |
| 2017/0061625 A1 * | 3/2017 | Estrada | G06K 9/6267 |
| 2018/0060701 A1 * | 3/2018 | Krishnamurthy | G06K 9/6269 |
| 2018/0137551 A1 * | 5/2018 | Zheng | G06F 16/532 |

(Continued)

FOREIGN PATENT DOCUMENTS

WO   WO-2016155564 A1   10/2016

OTHER PUBLICATIONS

Kholgade, Natasha, et al. "3D object manipulation in a single photograph using stock 3D models." ACM Transactions on Graphics (TOG) 33.4 (2014): 127.

(Continued)

*Primary Examiner* — Fred H Hu
(74) *Attorney, Agent, or Firm* — Mintz Levin Cohn Ferris Glovsky and Popeo, P.C.

(57) ABSTRACT

In one respect, there is provided a system that may include a processor and a memory. The memory may be configured to store instructions that results in operations when executed by the processor. The operations may include: training a machine learning model by at least processing a training set with the machine learning model, the training set including at least one synthetic image that is generated by applying one or more modifications to a non-synthetic image; determining, based at least on a result of the processing of the mixed training set, that the machine learning model is unable to classify images having a specific modification; and training the machine learning model with additional training data that includes one or more additional synthetic images having the specific modification. Related methods and articles of manufacture are also disclosed.

16 Claims, 6 Drawing Sheets

(56) References Cited

U.S. PATENT DOCUMENTS

2018/0157934 A1* 6/2018 Hu .................... G06K 9/00791

OTHER PUBLICATIONS

Richter, Stephan R., et al. "Playing for Data: Ground Truth from Computer Games." arXiv preprint arXiv:1608.02192 (2016).
Su, Hao, et al. "Render for cnn: Viewpoint estimation in images using cnns trained with rendered 3d model views." Cornell University Library, arXiv:1505.05641. 2015.
Jaderberg, Max, et al., "Reading text in the wild with convolutional neural networks." *International Journal of Computer Vision* 116.1 (2016): 1-20.
Jaderberg, Max, et al., "Synthetic data and artificial neural networks for natural scene text recognition." *arXiv preprint arXiv:1406.2227* (2014).
Wang, Yida, and Weihong Deng. "Self-restraint object recognition by model based CNN learning." *Image Processing (ICIP), 2016 IEEE International Conference on.* IEEE, 2016.

\* cited by examiner

TRAINING MACHINE LEARNING MODELS

FIELD

The present disclosure generally relates to machine learning and, more specifically, to the training of a machine learning model.

BACKGROUND

Machine learning models may be trained to perform a variety of cognitive tasks including, for example, image classification and speech recognition. A convolutional neural network is a type of machine learning model that may be trained through supervised learning. For instance, training a convolutional neural network may include identifying errors that may be present in the classifications made by the convolutional neural network and subsequently minimizing these errors through repeated adjustments to the convolutional neural network.

SUMMARY

Methods, systems, and articles of manufacture, including computer program products, are provided for training machine learning models. In some implementations of the current subject matter, there is provided a system. The system can include at least one processor and at least one memory. The at least one memory can include program code that provides operations when executed by the at least one processor. The operations may include: training a machine learning model by at least processing a training set with the machine learning model, the training set including at least one synthetic image that is generated by applying one or more modifications to a non-synthetic image; determining, based at least on a result of the processing of the mixed training set, that the machine learning model is unable to classify images having a specific modification; and training the machine learning model with additional training data that includes one or more additional synthetic images having the specific modification.

In some variations, one or more of the features disclosed herein including the following features can optionally be included in any feasible combination. The one or more modifications may include reorienting and/or occluding an object depicted in the non-synthetic image. The one or more modifications may include changing a perspective and/or a lighting associated with the non-synthetic image.

In some variations, the training set may be generated to include the non-synthetic image and the at least one synthetic image. The generating of the training set may include balancing a quantity of non-synthetic images and a quantity of synthetic images in the training set. The balancing may include generating, based at least on the non-synthetic image, at least one additional non-synthetic image. The generating of the at least one additional non-synthetic image may include at least one of scaling, rotating, blurring, sharpening, burning, or dodging the non-synthetic image.

In some variations, the training of the machine learning model with the additional training data may be repeated until a performance of the machine learning model meets a threshold value. The performance of the convolutional network may meet the threshold value, when the machine learning model is able to correctly classify a threshold quantity of synthetic images having the specific modification. The performance of the machine learning model may meet the threshold value, when the machine learning model achieves convergence, and wherein the machine learning model achieves convergence when an error function associated with the machine learning model is at minima.

In some variations, the machine learning model may be a convolutional neural network.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
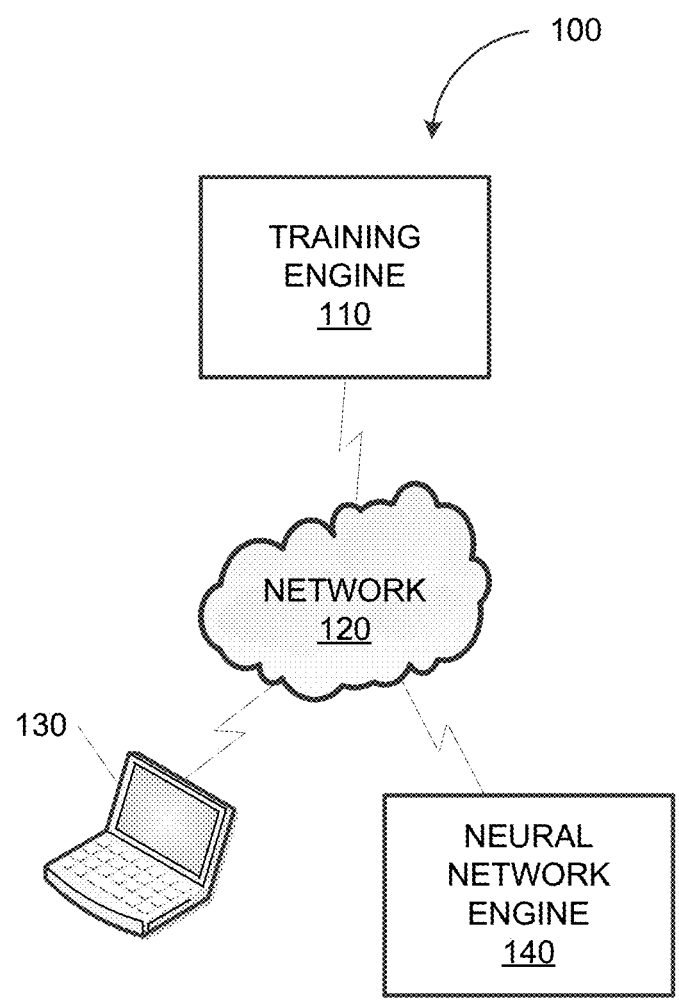
FIG. 1 depicts a network diagram illustrating a network environment, in accordance with some example embodiments.

Like labels are used to refer to same or similar items in the drawings.

DETAILED DESCRIPTION

A machine learning model, such as a convolutional neural network, may be trained by processing training data and validation data with the machine learning model. Training data may include data that has been labeled with the correct classifications for the data while validation data may be similarly labeled data that is not used as training data. To train a convolutional neural network to classify images, the training data and the validation data should include sets of images depicting objects that have been subject to a gamut of geometric and color transformations. However, generating a comprehensive image set for use as training data and/or validation data may be a time-consuming endeavor that entails manually acquiring and labeling a large number of images. As such, the size and scope of image sets that are typically used for training convolutional neural networks may be limited, thereby reducing the efficacy of the training.

In some example embodiments, a convolutional neural network may be trained using a mixed training set that includes both synthetic and non-synthetic images. The non-synthetic images may be labeled with classifications that correspond to the objects depicted in these images. Meanwhile, the synthetic images may be generated based on the non-synthetic images and may inherit the same labels as the corresponding non-synthetic images. The inclusion of synthetic images that inherit the same labels as the corresponding non-synthetic images may augment size and scope of the training set without engendering a time consuming image collection and labeling process.

According to some example embodiments, a synthetic image may be generated by at least modifying a non-synthetic image. For instance, the non-synthetic image may depict a three-dimensional scene that includes one or more objects (e.g., a logo) within an environment (e.g., buildings, trees, streets). As such, the modifications to the non-synthetic image may include, for example, reorienting (e.g., rotating) and/or occluding (e.g., obscuring) the one or more objects depicted in the non-synthetic image. Alternately and/or additionally, the modifications to the non-synthetic image may include altering the environment depicted in the non-synthetic image by at least applying, for instance, a different lighting and/or a different perspective (e.g., camera angle and/or position) to the non-synthetic image.

In some example embodiments, a convolutional neural network may be trained using a mixed training set to at least identify modifications (e.g., reorientation, occlusion) that may cause the convolutional neural network to misclassify one or more images. For example, in processing the mixed training set, the convolutional neural network may misclassify synthetic images that depict occluded object and/or images having changed perspectives. As such, additional training data may be generated to include synthetic images depicting occluded objects and/or synthetic images with changed perspectives. The convolutional neural network may be further trained using this additional training data, thereby generating a trained convolutional neural network that is capable of correctly classifying images exhibiting such modifications. It should be appreciated that training the convolutional neural network in this targeted manner may accelerate the training process. For instance, the convolutional neural network may achieve convergence more quickly, which may occur when the error function or cost function associated with the convolutional neural network reaches minima (e.g., stops decreasing).

FIG. 1 depicts a network diagram illustrating a network environment 100, in accordance with some example embodiments. Referring to FIG. 1, a training engine 110 may be communicatively coupled, via a wired and/or wireless network 120, to client device 130 and/or a neural network engine 140. The wired and/or wireless network 120 can be a wide area network (WAN), a local area network (LAN), and/or the Internet.

In some example embodiments, the neural network engine 140 may be configured to implement one or more machine learning models including, for example, a convolutional neural network. As such, the neural network engine 140 may be trained to serve as, for example, an image classifier. According to some example embodiments, the training engine 110 may be configured to generate a mixed training set that includes both synthetic images and non-synthetic images. The training engine 110 may be further configured to process the mixed training set with a convolutional neural network (e.g., implemented by the neural network engine 140) and determine the performance of the convolutional neural network in classifying the images included the mixed training set. According to some example embodiments, the training engine 110 may generate, based at least on the performance of the convolutional neural network, additional training data. The additional training data may include images with modifications that may cause the convolutional neural network to misclassify one or more synthetic images in the mixed training set.

In some example embodiments, the training engine 110 may generate synthetic images based on non-synthetic images that are associated with one or more labels. For instance, a non-synthetic image may depict a three-dimensional scene having one or more objects within an environment. The labels associated with the non-synthetic image may correspond to the one or more objects and/or the environment. To generate the synthetic image, the training engine 110 may apply, to the non-synthetic image, modifications to the objects and/or the environment depicted in the non-synthetic image. For example, the non-synthetic image may be modified by, for example, modifying the objects (e.g., reorientation and/or occlusion) and/or modifying the environment (e.g., changing lighting and/or perspective). Since the resulting synthetic image may depict the same objects in the same environment as the non-synthetic image, the synthetic image may inherit one or more of the same label as the non-synthetic image.

The quantity of non-synthetic images may be substantially lower than the quantity of synthetic images that may be generated based on the non-synthetic images. Thus, in some example embodiments, in addition to generating the synthetic images, the training engine 110 may balance the proportion of non-synthetic images and synthetic images by at least generating one or more duplicate and/or altered versions (e.g., sharpened, blurred, scaled, rotated, burned, dodged) of the non-synthetic images. Because these types of alterations may not change, for example, the individual components (e.g., objects, environment) and/or composition of the three-dimensional scene depicted in the non-synthetic image, the resulting images may still constitute non-synthetic images. By generating duplicate and/or altered versions of the non-synthetic images, the resulting mixed training set may include a higher proportion (e.g., more than 1%) of non-synthetic images relative to synthetic images.

In some example embodiments, the client device 130 may provide a user interface for interacting with the training engine 110 and/or neural network engine 140. For example, a user may provide, via the client device 130, at least a portion of the non-synthetic images used to generate the mixed training set. The user may also provide, via the client device 130, one or more training sets, validation sets, and/or production sets for processing by the neural network engine 140. Alternately and/or additionally, the user may provide, via the client device 130, one or more configurations for the neural network engine 140 including, for example, hyper parameters such as a stride size that is used by the neural network engine 140 when processing one or more mixed training sets, validation sets, and/or production sets. The user may further receive, via the client device 130, outputs from the neural network engine 140 including, for example, classifications for the mixed training set, validation set, and/or production set.

In some example embodiments, the functionalities of the training engine 110 and/or the neural network engine 140 may be accessed (e.g., by the client device 130) as a remote service (e.g., a cloud application) via the network 120. For instance, the training engine 110 and/or the neural network engine 140 may be deployed at one or more separate remote platforms. Alternately and/or additionally, the training engine 110 and/or the neural network engine 140 may be deployed (e.g., at the client device 130) as computer software and/or dedicated circuitry (e.g., application specific integrated circuits (ASICs)).

Figure 2:
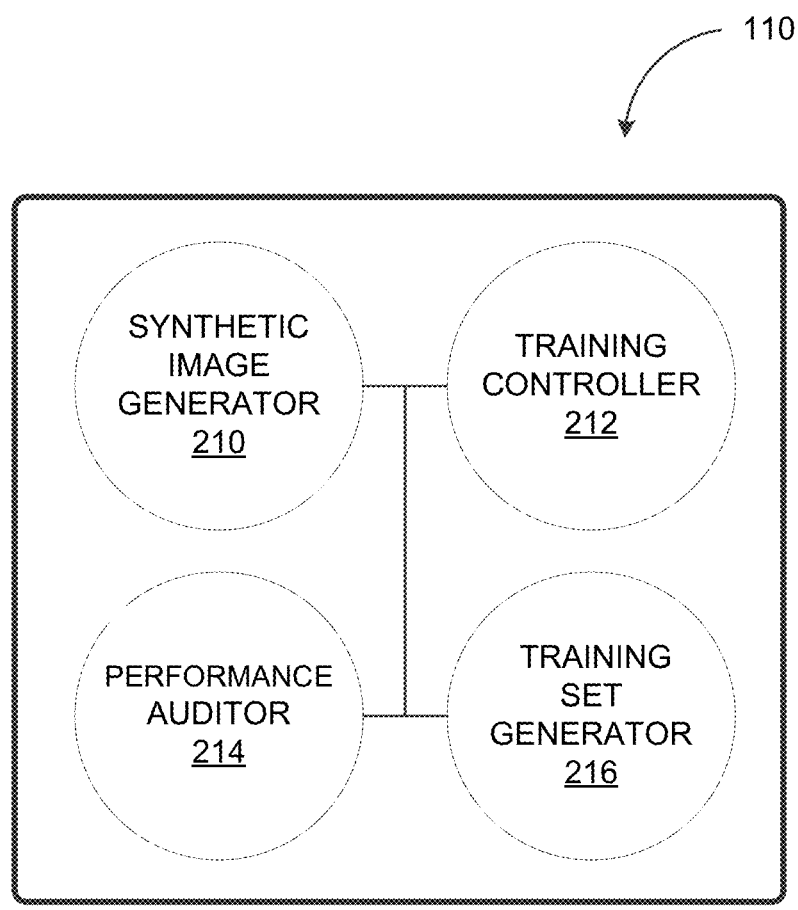
FIG. 2 depicts a block diagram illustrating a training engine, in accordance with some example embodiments.

FIG. 2 depicts a block diagram illustrating the training engine 110, in accordance with some example embodiments. Referring to FIGS. 1-2, the training engine 110 may include a synthetic image generator 210, a training controller 212, a performance auditor 214, and a training set generator 216. It should be appreciated that the training engine 110 may include additional and/or different components.

Figure 3A:
FIG. 3A depicts a non-synthetic image, in accordance with some example embodiments.

As noted above, the training engine 110 may be configured to generate a mixed training set for training a convolutional neural network (e.g., implemented by the neural network engine 140). In some example embodiments, the synthetic image generator 210 may be configured to generate a plurality of synthetic images that are included in a mixed training set used for training the convolutional neural network. The synthetic image generator 210 may generate one or more synthetic images by at least modifying a non-synthetic image, which may include a three-dimensional scene having one or more objects within an environment. FIG. 3A depicts a non-synthetic image 300, in accordance with some example embodiments. As shown in FIG. 3A, the non-synthetic image 300 may depict a three dimensional scene that includes a first object 312 (e.g., vehicle) and a second object 314 (e.g., a sign) within an environment 320 (e.g., building, street).

In some example embodiments, the synthetic image generator 210 may generate a synthetic image from the non-synthetic image 300 by at least modifying the first object 312, the second object 314, and/or the environment 320. For instance, the non-synthetic image 300 may be modified by at least reorienting the first object 312, occluding the second object 314, and/or changing the perspective (e.g., camera angle) of the environment 320.

According to some example embodiments, the first object 312 may be a three-dimensional object. As such, the first object 312 may be reoriented based on a plurality of three-dimensional coordinates corresponding to the vertices and/or topology of the first object 312. Here, the synthetic image generator 210 may compute, based on these three-dimensional coordinates, a bounding box that defines the minimum and maximum coordinates of the first object 312. Similar bounding boxes may be computed for other objects appearing in the environment 320 such as, for example, the second object 314. Table 1 below depicts an example of a bounding box, which may be used to describe the first object 312.

TABLE 1

$P_0 = <\min_i\{v_x^i\}, \min_i\{v_y^i\}, \min_i\{v_z^i\}>;$
$P_1 = <\min_i\{v_x^i\}, \max_i\{v_y^i\}, \min_i\{v_z^i\}>;$
$P_2 = <\max_i\{v_x^i\}, \max_i\{v_y^i\}, \min_i\{v_z^i\}>;$
$P_3 = <\max_i\{v_x^i\}, \min_i\{v_y^i\}, \min_i\{v_z^i\}>;$
$P_4 = <\max_i\{v_x^i\}, \min_i\{v_y^i\}, \max_i\{v_z^i\}>;$
$P_5 = <\max_i\{v_x^i\}, \max_i\{v_y^i\}, \max_i\{v_z^i\}>;$
$P_6 = <\min_i\{v_x^i\}, \max_i\{v_y^i\}, \max_i\{v_z^i\}>;$
$P_7 = <\min_i\{v_x^i\}, \min_i\{v_y^i\}, \max_i\{v_z^i\}>.$ In some example embodiments, to generate a synthetic image, the coordinates of associated with the three-dimensional scene depicted in the non-synthetic image 300 (e.g., the coordinates of the first object 312 and/or the second object 314 as specified by the bounding box) may be transformed to world coordinates (e.g., Cartesian coordinates) by at least applying a model matrix M. World coordinates may be the coordinates of the first object 312 and/or the second object 314 in a three-dimensional coordinate system defined for the whole scene that is depicted in the non-synthetic image 300. These world coordinates may be further transformed to camera coordinates by at least applying an inverse of a view matrix $V=CT^{-1}$. Camera coordinates may define the three-dimensional scene from the camera's frame of reference. Here, the camera's position may be defined as the origin with height of the scene being defined along the y-axix and the depth of the scene being defined along the z-axis.

Furthermore, a projection matrix P and perspective division may be applied to the coordinates of the three-dimensional scene depicted in the non-synthetic image 300 to transform the scene to normalized device coordinates. Transforming the scene to normalized device coordinates may map the world coordinates are mapped to a [−1,1]×[−1,1]×[−1,1] cube. These resulting normalized device coordinates may be further mapped to screen space coordinates by at least applying a viewpoint matrix VP. Here, the synthetic image generator 210 may compute, based on normalized device coordinates, axes aligned bounding boxes for objects (e.g., the first object 312 and/or the second object 314) appearing in the non-synthetic image 300. In doing so, the normalized device coordinates may be mapped to 2-dimensional coordinates in an image plane.

Table 2 below depicts an example of an axes aligned bounding box, which may be associated with the first object 312. Modifications to the non-synthetic image 300, including to the first object 312, the second object 314, and/or the environment 320, may be performed based on axes aligned bounding boxes. Modifying the non-synthetic image 300 in this manner may preserve, in the resulting synthetic images, photorealistic details from the non-synthetic image 300 including, for example, shadows and reflections (e.g., cast by the first object 312).

TABLE 2

Figure 3B:
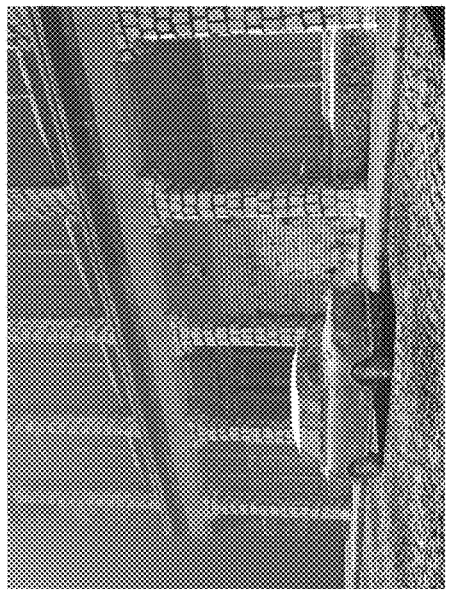
FIG. 3B depicts a plurality of synthetic images, in accordance with some example embodiments.
Figure 3B:
Figure 3B:
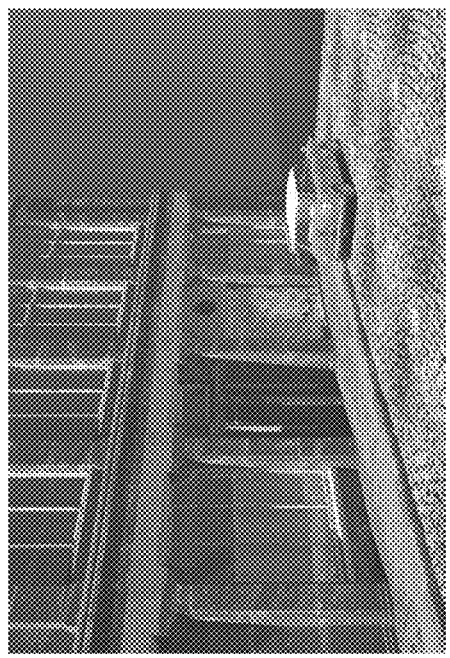
Figure 3B:

$\mathcal{P}_0 = <\min_{i=0}^7 \{Q_{i_x}\}, \min_{i=0}^7 \{Q_{i_y}\}>;$
$\mathcal{P}_1 = <\min_{i=0}^7 \{Q_{i_x}\}, \max_{i=0}^7 \{Q_{i_y}\}>;$
$\mathcal{P}_2 = <\max_{i=0}^7 \{Q_{i_x}\}, \max_{i=0}^7 \{Q_{i_y}\}>;$
$\mathcal{P}_3 = <\max_{i=0}^7 \{Q_{i_x}\}, \min_{i=0}^7 \{Q_{i_y}\}>.$ FIG. 3B depicts a plurality of synthetic images, in accordance with some example embodiments. Referring to FIGS. 3A-B, the synthetic image generator 210 may modify the non-synthetic image 300 to generate at least a first synthetic image 330, a second synthetic image 332, a third synthetic image 334, and a fourth synthetic image 336.

As shown in FIG. 3B, the non-synthetic image 300 may be modified by at least modifying the first object 312, the second object 314, and/or the environment 320. For example, the first synthetic image 330 and the fourth synthetic image 336 may be generated by changing the perspective of the three-dimensional scene depicted in the non-synthetic image 300. The second synthetic image 332 may be generated by changing the lighting of the three-dimensional scene depicted in the non-synthetic image 300 (e.g., to add fog, sunshine, rain, night lights, and/or snow).

Meanwhile, generating the third synthetic image 334 and the fourth synthetic image 336 may require further modifications to the first object 312 and the second object 314. For instance, the color of the first object 312 may be changed in order to generate the third synthetic image 334 and the fourth synthetic image 336. Alternately and/or additionally, the second object 314 may be occluded, for example, by a logo that may also be superimposed on the first object 312. According to some example embodiments, the non-synthetic image 300 may be modified in a manner that enables photorealistic details to be preserved in the synthetic images generated from the non-synthetic image 300. Thus, as shown in FIG. 3B, the first synthetic image 330, the second synthetic image 332, the third synthetic image 334, and the fourth synthetic image 336 may all depict the shadow and/or reflections that would be cast by, for example, the first object 312.

In some example embodiments, the training set generator 216 may generate a mixed training set for training a convolutional neural network (e.g., implemented by the neural network engine 140). The mixed training set may include the non-synthetic image 300, the first synthetic image 330, the second synthetic image 332, the third synthetic image 334, and the fourth synthetic image 336. As the first synthetic image 330, the second synthetic image 332, the third synthetic image 334, and the fourth synthetic image 336 all depict the same three-dimensional scene (e.g., with the same first object 312, the second object 314, and the environment 320) as the non-synthetic image 300, the first synthetic image 330, the second synthetic image 332, the third synthetic image 334, and the fourth synthetic image 336 should have the same labels (e.g., vehicle, sign) as the non-synthetic image 300.

According to some example embodiments, generating the mixed training set may include balancing the quantity of non-synthetic images and synthetic images included in the mixed training set. For instance, a large number of synthetic images (e.g., the first synthetic image 330, the second synthetic image 332, the third synthetic image 334, and the fourth synthetic image 336) may be generated from a relatively small number of non-synthetic images (e.g., the non-synthetic image 300). To prevent generating a mixed training set that includes a disproportionately large number of synthetic images, the training set generator 216 may generate additional non-synthetic images that may be included in the mixed training set. For example, the training set generator 216 may generate additional non-synthetic images by at least generating duplicate versions of the non-synthetic image 300. Alternately and/or additionally, the training set generator 216 may generate additional non-synthetic images by at least, for example, sharpening, blurring, scaling, rotating, burning, and/or dodging the non-synthetic image 300.

In some example embodiments, the training controller 218 may be configured to conduct the training of a convolutional neural network (e.g., implemented by the neural network engine 140). For example, the training controller 218 may train the convolutional neural network by at least processing, with the convolutional neural network, a mixed training set that includes the non-synthetic image 300, the first synthetic image 330, the second synthetic image 332, the third synthetic image 334, and the fourth synthetic image 336. The errors that are present in the classifications of the mixed training set (e.g., relative to the labels associated with the mixed training set) may be minimized by at least back propagating these errors (e.g., through the convolutional neural network) and performing gradient descent. According to some example embodiments, the training controller 218 may train the convolutional neural network over several epochs during which the convolutional neural network processes the same mixed training set multiple times.

In some example embodiments, the performance auditor 214 may be configured to determine the performance of a convolutional neural network (e.g., implemented by the neural network engine 140) in processing the mixed training set. For example, the performance auditor 214 may determine, based on a result of the processing of a mixed training set performed by the convolutional neural network, that the convolutional neural network misclassifies synthetic images from the mixed training set that have been subject to certain modifications. To illustrate, the performance auditor 214 may determine, based on the result of the processing of the mixed training set, that the convolutional neural network misclassified the, for example, the first synthetic image 330 and the fourth synthetic image 336. As noted earlier, the first synthetic image 330 and the fourth synthetic image 336 may be generated by at least altering the perspective of the non-synthetic image 300. Accordingly, the performance auditor 214 may determine that the convolutional neural network is unable to successfully classify synthetic images having changed perspectives.

In some example embodiments, the training controller 212 may conduct additional training of the convolutional neural network based at least on the performance of the convolutional neural network in processing a mixed training set (e.g., as determined by the performance auditor 214). The training controller 212 may train the convolutional neural network using additional training data that have been generated (e.g., by the synthetic image generator 210 and/or the training set generator 216) to include synthetic images that have been subject to modifications that the performance auditor 214 determines to cause the convolutional neural network to misclassify images. Referring to the previous example, the performance auditor 214 may determine that the convolutional neural network is unable to successfully classify, for example, a threshold quantity (e.g., number, percentage) of synthetic images having changed perspectives. As such, the synthetic image generator 210 may generate additional synthetic images having changed perspectives. Meanwhile the training controller 212 may train the convolutional neural network with additional training data that includes the synthetic images with changed perspectives (e.g., generated by the synthetic image generator 210). The training controller 212 may continue to train the convolutional neural network with additional training data until the performance of the convolutional neural network (e.g., as determined by the performance auditor 214) meets a certain threshold value (e.g., fewer than x number of misclassifications per training set and/or validation set).

Figure 4:
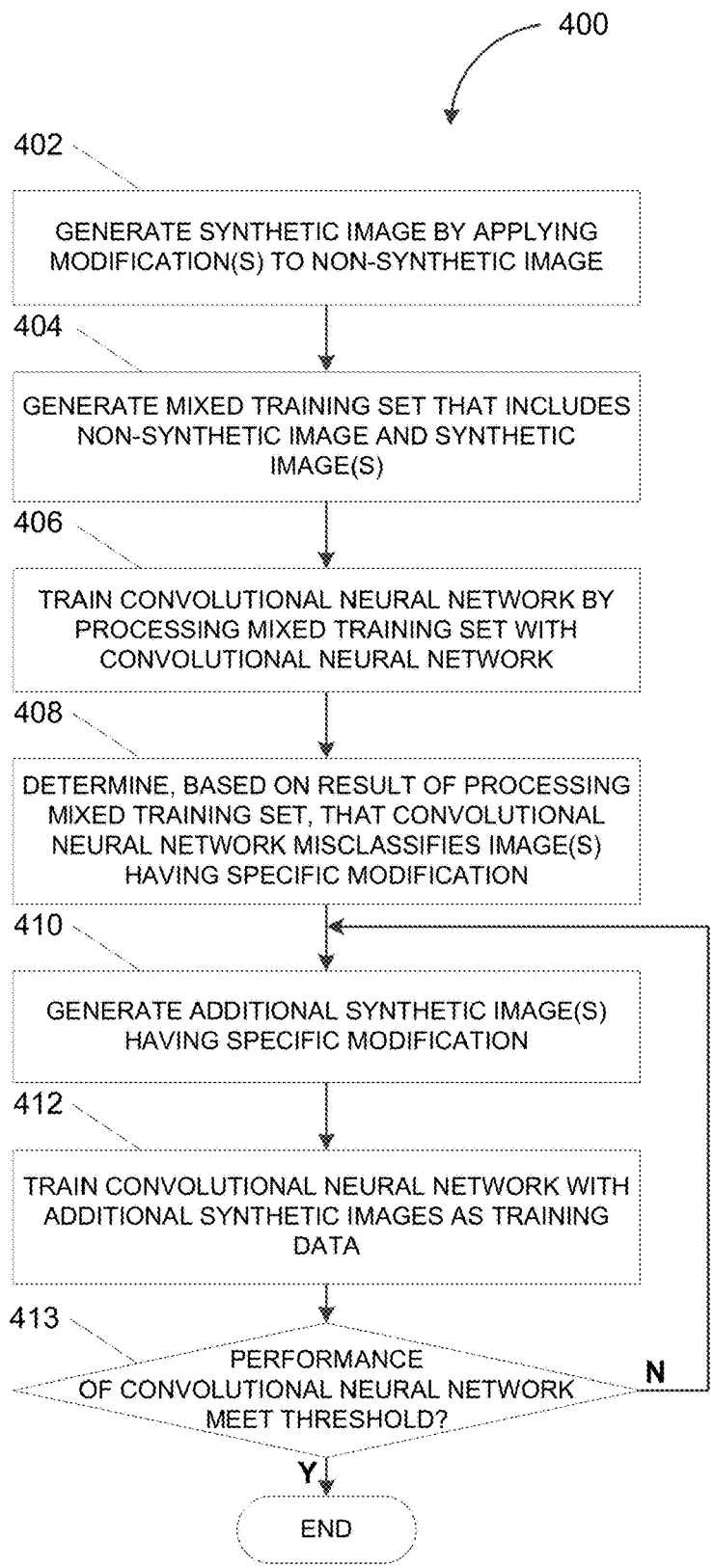
FIG. 4 depicts a flowchart illustrating a process for training a machine learning model, in accordance with some example embodiments.

FIG. 4 depicts a flowchart illustrating a process 400 for training a machine learning model, in accordance with some example embodiments. Referring to FIGS. 1-2, 3A-B, and 4, the process 400 may be performed by the training engine 110.

The training engine 110 may generate a synthetic image by at least applying one or more modifications to a non-synthetic image (402). For example, the training engine 110 (e.g., the synthetic image generator 210) may apply one or more modifications to the non-synthetic image 300 to generate the first synthetic image 330, the second synthetic image 332, the third synthetic image 334, and/or the fourth synthetic image 336. The modifications may include modifications to the three-dimensional scene depicted in the non-synthetic image 300, which includes the first object 312 (e.g., a vehicle) and the second object 314 (e.g., a sign) in the environment 320. Referring to FIGS. 3A-B, the non-synthetic image 300 may be modified by reorienting and/or occluding the first object 312 and/or the second object 314. Alternately and/or additionally, the non-synthetic image 300 may be modified by changing the lighting and/or perspective of the environment 320.

The training engine 110 may generate a mixed training set that includes the non-synthetic image and the synthetic image (404). For example, the training engine 110 (e.g., the training set generator 216) may generate a mixed training set that includes the non-synthetic image 300, the first synthetic image 330, the second synthetic image 332, the third synthetic image 334, and/or the fourth synthetic image 336. In some example embodiments, generating the mixed training set may further include balancing the quantity of synthetic images and the quantity of non-synthetic images in the mixed training set. For instance, the training engine 110 (e.g., the training set generator 216) may generate, based on the non-synthetic image 300, additional non-synthetic images. These additional non-synthetic images may include, for example, scaled, rotated, burned, dodged, blurred, and/or sharpened versions of the non-synthetic image 300. The resulting mixed training set may include a relatively higher proportion (e.g., more than 1%) of non-synthetic images.

The training engine 110 may train a machine learning model by at least processing the mixed training set with the convolutional neural network (406). For example, the training engine 110 (e.g., the training controller 212) may train a convolutional neural network (e.g., implemented by the neural network engine 140) by at least processing the mixed training set with the convolutional neural network.

The training engine 110 may determine, based at least on a result of processing the mixed training set, that the machine learning model misclassifies one or more synthetic images having a specific modification (408). In some example embodiments, the training engine 110 (e.g., the performance auditor 214) may identify, based at least on the result of the processing of the mixed training set, synthetic images that the convolutional neural network is unable to correctly classify. The training engine 110 may further determine the modifications that were made to generate the synthetic images that the convolutional neural network is unable to correctly classify. For instance, the training engine 110 may determine, based at least on the result of the processing of the mixed training set, that the convolutional neural network misclassified the first synthetic image 330 and the fourth synthetic image 336, which were both generated by altering the perspective of the non-synthetic image 300. As such, the training engine 110 may determine that the convolutional neural network is unable to classify synthetic images having altered perspectives.

The training engine 110 may generate one or more additional synthetic images having the specific modification (410). For example, the training engine 110 (e.g., the synthetic image generator 210) may generate additional synthetic images having changed perspectives, when the training engine 110 (e.g., the performance auditor 214) determines that the convolutional neural network is unable to correctly classify synthetic images having changed perspectives.

The training engine 110 may train the machine learning model with the one or more additional synthetic images as training data (412). For example, the training engine 110 may train the convolutional neural network with training data that includes additional synthetic images having changed perspectives.

The training engine 110 may determine, based at least on a result of processing the one or more additional synthetic images, whether a performance of the machine learning model meets a threshold value (413). For example, the training engine 110 (e.g., the performance auditor 214) may determine whether the convolutional neural network is able to correctly classify a threshold quantity (e.g., number and/or percentage) of images in a training set and/or a validation set, which may include synthetic images having changed perspectives. Alternately and/or additionally, the training engine 110 (e.g., the performance auditor 214) may determine whether a quantity (e.g., number and/or percentage) of misclassified images is below a threshold value. In some example embodiments, the training engine 110 (e.g., the performance auditor 214) may further gauge the performance of the convolutional neural network based on the error function or cost function associated with the convolutional neural network. The performance of the convolutional neural network may be determined to meet the threshold value, when the error function or the lost function associated with convolutional neural network is at minima (e.g., stops decreasing). It should be appreciated that the convolutional neural network may achieve convergence when the error function or the lost function associated with convolutional neural network is at minima.

If the training engine 110 determines that the performance of the machine learning model meets the threshold value (413-Y), the process 400 may terminate at operation 413. Alternately and/or additionally, if the training engine 110 determines that the performance of the machine learning model does not meet the threshold value (413-N), the process 400 may continue at operation 410. For instance, when the training engine 110 (e.g., the performance auditor 214) determines that the performance of the convolutional neural network does not meet the threshold value, the training engine 110 (e.g., the synthetic image generator 210) may generate additional training data, which may include synthetic images having the modifications that are applied to the synthetic images misclassified by the convolutional neural network. Furthermore, the training engine 110 (e.g., the training controller 212) may continue to train the convolutional neural network by at least processing the additional training data with the convolutional neural network. This process of training the convolutional neural network with additional training data may be repeated (e.g., over multiple epochs) until the performance of the convolutional neural network meets the threshold value.

Figure 5:
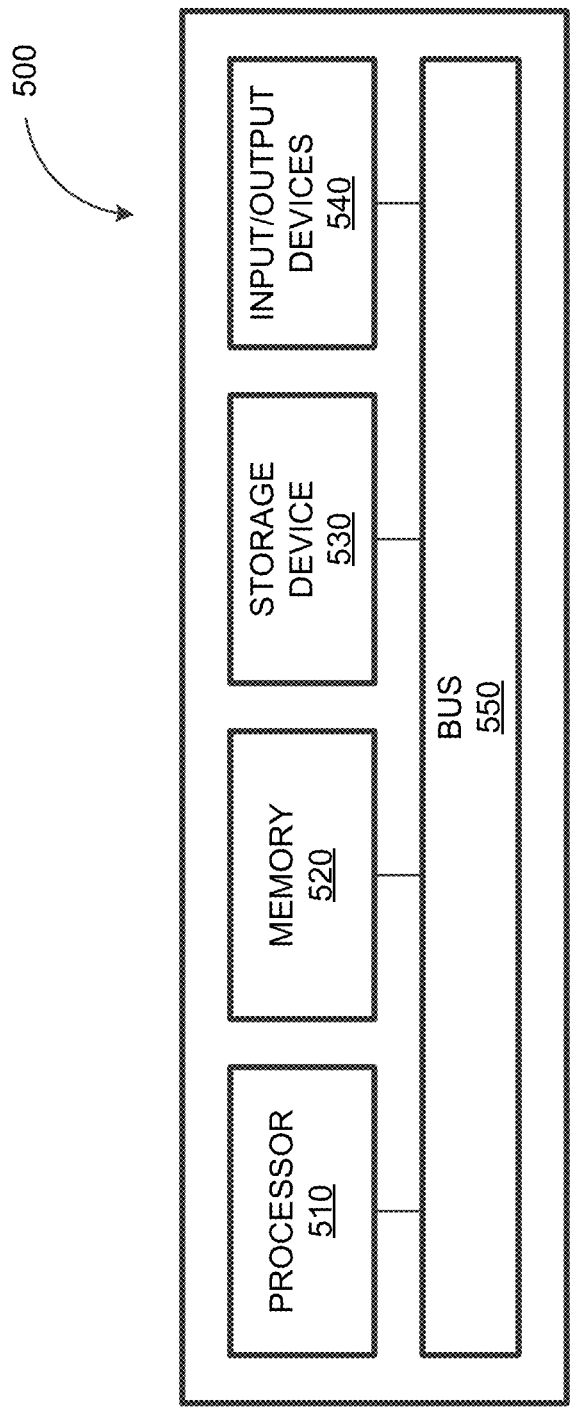
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the training engine 110, the client device 130, the neural network engine 140, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the training engine 110, the client device 130, and/or the neural network engine 140. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   generating a training set to include a first non-synthetic image and a first synthetic image, the first synthetic image generated by at least reorienting an object in a three dimensional scene depicted in the first non-synthetic image, the object being reoriented by at least mapping a first plurality of coordinates of the object in the three dimensional scene to a second plurality of coordinates of the object in a two dimensional image plane of the non-synthetic image;

balancing a first quantity of non-synthetic images included the training set relative to a second quantity of synthetic images included in the training set, the balancing includes generating, based on the first non-synthetic image, a second non-synthetic image to include in the training set;

training a machine learning model by at least processing the training set with the machine learning model, the training set including the first quantity of non-synthetic images and the second quantity of synthetic images;

determining, based at least on a result of the processing of the training set, that the machine learning model is unable to classify a threshold quantity of images having a first modification but is able to classify a threshold quantity of images having a second modification; and in response to the machine learning model being unable to classify the threshold quantity of images having the first modification and able to classify the threshold quantity of images having the second modification, training the machine learning model with additional training data that includes one or more additional synthetic images having the first modification but not the second modification.

2. The system of claim 1, wherein the first modification or the second modification includes occluding the object.

3. The system of claim 1, wherein the first modification or the second modification includes changing a perspective and/or a lighting of the three dimensional scene.

4. The system of claim 1, wherein the second non-synthetic image is generated by at least one of scaling, rotating, blurring, sharpening, burning, or dodging the first non-synthetic image.

5. The system of claim 1, wherein the training of the machine learning model with the additional training data is repeated until a performance of the machine learning model meets a threshold value.

6. The system of claim 5, wherein the performance of the machine learning model meets the threshold value based at least on the machine learning model being able to correctly classify the threshold quantity of images having the first modification.

7. The system of claim 5, wherein the performance of the machine learning model meets the threshold value, when the machine learning model achieves convergence, and wherein the machine learning model achieves convergence when an error function associated with the machine learning model is at minima.

8. A computer-implemented method, comprising:

generating a training set to include a first non-synthetic image and a first synthetic image, the first synthetic image generated by at least reorienting an object in a three dimensional scene depicted in the first non-synthetic image, the object being reoriented by at least mapping a first plurality of coordinates of the object in the three dimensional scene to a second plurality of coordinates of the object in a two dimensional image plane of the non-synthetic image;

balancing a first quantity of non-synthetic images included the training set relative to a second quantity of synthetic images included in the training set, the balancing includes generating, based on the first non-synthetic image, a second non-synthetic image to include in the training set;

training a machine learning model by at least processing the training set with the machine learning model, the training set including the first quantity of non-synthetic images and the second quantity of synthetic images;

determining, based at least on a result of the processing of the training set, that the machine learning model is unable to classify a threshold quantity of images having a first modification but is able to classify a threshold quantity of images having a second modification; and in response to the machine learning model being unable to classify the threshold quantity of images having the first modification and able to classify the threshold quantity of images having the second modification, training the machine learning model with additional training data that includes one or more additional synthetic images having the first modification but not the second modification.

9. The method of claim 8, wherein the first modification or the second modification includes occluding the object.

10. The method of claim 8, wherein the first modification or the second modification includes changing a perspective and/or a lighting of the three dimensional scene.

11. The method of claim 8, wherein the second non-synthetic image is generated by at least one of scaling, rotating, blurring, sharpening, burning, or dodging the first non-synthetic image.

12. The method of claim 8, wherein the training of the machine learning model with the additional training data is repeated until a performance of the machine learning model meets a threshold value.

13. The method of claim 12, wherein the performance of the machine learning model meets the threshold value based at least on the machine learning model being able to correctly classify the threshold quantity of images having the first modification.

14. A non-transitory computer-readable storage medium including program code, which when executed by at least one data processor, cause operations comprising:

generating a training set to include a first non-synthetic image and a first synthetic image, the first synthetic image generated by at least reorienting an object in a three dimensional scene depicted in the first non-synthetic image, the object being reoriented by at least mapping a first plurality of coordinates of the object in the three dimensional scene to a second plurality of coordinates of the object in a two dimensional image plane of the non-synthetic image;

balancing a first quantity of non-synthetic images included the training set relative to a second quantity of synthetic images included in the training set, the balancing includes generating, based on the first non-synthetic image, a second non-synthetic image to include in the training set;

training a machine learning model by at least processing the training set with the machine learning model, the training set including the first quantity of non-synthetic images and the second quantity of synthetic images;

determining, based at least on a result of the processing of the training set, that the machine learning model is unable to classify a threshold quantity of images having a first modification but is able to classify a threshold quantity of images having a second modification; and in response to the machine learning model being unable to classify the threshold quantity of images having the first modification and able to classify the threshold quantity of images having the second modification, training the machine learning model with additional training data that includes one or more additional synthetic images having the first modification but not the second modification.

15. The system of claim 1, wherein the reorienting of the object further includes transforming the first plurality of coordinates of the object in the three-dimensional scene to a third plurality of coordinates corresponding to a frame of reference of a camera capturing the three dimensional scene, and wherein the reorienting of the object further includes normalizing the third plurality of coordinates before mapping the third plurality of coordinates to the second plurality of coordinates of the object in the two dimensional image plane of the non-synthetic image.

16. The system of claim 1, wherein the reorienting the object further includes determining a bounding box for the object, and wherein the bounding box of the object defines one or more maximum values and minimum values of the first plurality of coordinates of the object in the three dimensional scene.

* * * * *